United States Patent [19]

Vielman

[11] 4,142,428
[45] Mar. 6, 1979

[54] TIRE PATCHING APPARATUS

[76] Inventor: Edmund V. Vielman, 661 Fern Meadow, Universal City, Tex. 78148

[21] Appl. No.: 870,282

[22] Filed: Jan. 18, 1978

[51] Int. Cl.² ............................................. B60C 25/16
[52] U.S. Cl. .................................................... 81/15.5
[58] Field of Search ...................... 81/15.5, 15.6, 15.7

[56] References Cited

U.S. PATENT DOCUMENTS

| | | | |
|---|---|---|---|
| 610,594 | 9/1898 | Whitbeck | 81/15.5 |
| 671,357 | 4/1901 | Strouse | 81/15.6 |
| 2,956,460 | 10/1960 | Nowotny | 81/15.5 |
| 3,083,597 | 4/1963 | Best | 81/15.7 |

FOREIGN PATENT DOCUMENTS 1,040,921 10/1958 Fed. Rep. of Germany ............ 81/15.7

Primary Examiner—James L. Jones, Jr.
Assistant Examiner—J. T. Zatarga
Attorney, Agent, or Firm—Howard I. Podell

[57] ABSTRACT

A tire patching apparatus which is easy to use and can be employed by an untrained person, which includes a gun-shaped device including a container for adhesive in its handle; one wall of the container being a vertically pivoted piston actuated by the trigger to squeeze adhesive out from the barrel and a tubular rubber patch insertable in a hole in a tire and adapted to be temporarily secured by a clip and a chain to the gun while adhesive is spread around it while in the hole. The patch is pulled by the clip until the seat of the patch has reached the inside surface of the tire and then its projecting part is severed even with the tire tread.

3 Claims, 4 Drawing Figures

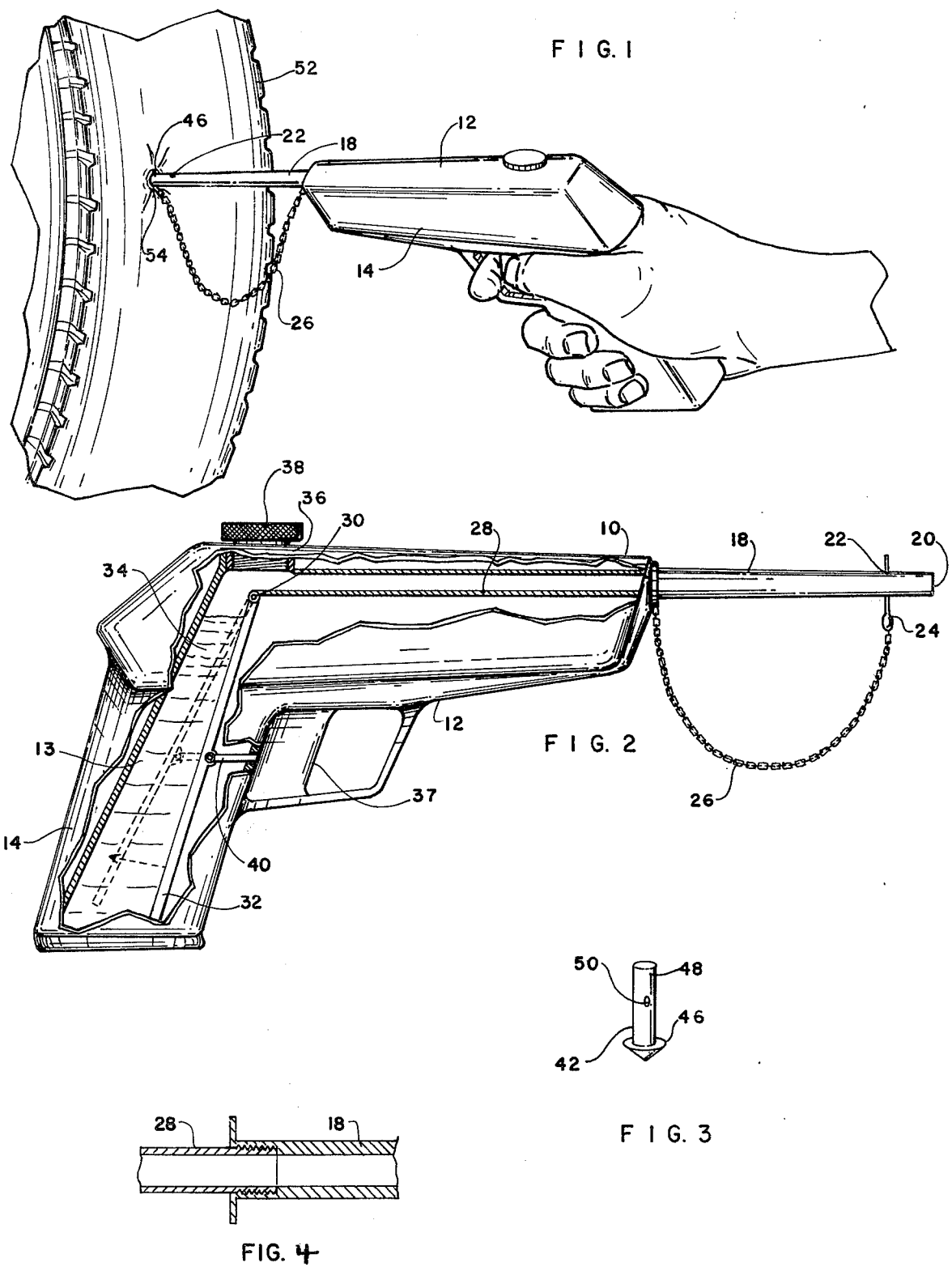

TIRE PATCHING APPARATUS

FIELD OF THE INVENTION

This invention relates generally to apparatus for injecting a patch and adhesive into a hole in a tire.

STATEMENT OF PRIOR ART

The prior art, as exemplified by U.S. Pat. Nos. 460,369; 610,594; 864,226; 671,357; 2,956,460 and 2,248,888 is generally illustrative of various devices of this type. Such devices have not proven to be entirely satisfactory in that they are either complex and expensive to manufacture, or bulky and inconvenient to use, or require unusual skill and/or dexterity to operate. As a result of the shortcomings of the prior art, typified by the above, there has developed and continues to exist a substantial need for devices of the character described. Despite this need, and the efforts of many individuals and companies to develop such devices, a satisfactory device meeting this need has heretofore been unavailable.

The principal object of this invention is to provide a device or article of this character which combines simplicity, strength and durability in a high degree, together with inexpensiveness of construction so as to encourage widespread use thereof.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

SUMMARY OF THE INVENTION

This invention resides in a tire patching apparatus which includes a gun-shaped device including a container for adhesive in its handle; one wall of the container being a vertically pivoted piston actuated by the trigger to squeeze adhesive out from the barrel and a tubular rubber patch insertable in a hole in a tire and adapted to be temporarily secured by a clip and a chain to the gun while adhesive to spread around it while in the hole. The patch is pulled by the clip until the seat of the patch has reached the inside surface of the tire and then its projecting part is severed even with the tire tread.

BRIEF DESCRIPTION OF THE DRAWING

In the accompanying drawing, in which is shown one of the various possible illustrative embodiments of this invention, wherein like reference character identify the same or like parts:

FIG. 1 is a view in perspective showing use of the assembly of the invention for plugging a hole in a tire;

FIG. 2 is a side elevation, partly in section of the injecting gun;

FIG. 3 is a perspective view of the bullet-shaped plug or patch according to the invention; and FIG. 4 is a detail sectional view of the invention.

DESCRIPTION OF THE PREFERRED EMBODIMENT

With reference to the drawing, there is shown and illustrated a tire patching apparatus constructed in accordance with the principles of the invention and designated generally by reference character 10. The particular device represented includes a gun-shaped adhesive injector 12. The injector 12 includes a hollow handle 14 enclosing chamber 13 merging into a central portion 16 from which a narrow tubular passage 28 emerges to join an external barrel 18. The extremity 20 of barrel 18 may be constructed of any of several diameters so as to fit snugly in holes made in tires by objects (such as nails) of varying diameters. A circular cylindrical transverse diametrical hole 22 is bored through barrel 18 to receive and hold therein clip 24 which is secured to the remote end of barrel 18 by chain 26 or other securing means. Barrel 18 has an inner channel 19 joined to channel 28 which extends to the top of chamber 13 in hollow handle 14. Pivoted at its end on hinge 30 is a lever 32 forming with the sides of handle 14 an adhesive chamber 34 which is refillable through opening 36. A cap 38 is threaded on the opening 36.

A trigger 37 is slidably mounted in the injector and operatively coupled to lever 32 by link 40. It will thus be apparent that by pulling on trigger 37 adhesive in chamber 34 will be squeezed out into barrel extension 28 and eventually out through barrel 18.

Associated with the above described assembly, is a patch or plug 42 made of rubber or other resilient impermeable material including certain plastics. This member includes a conical front section 44 terminating in an enlarged peripheral lip or seat 46 integral with a tubular rear section 48 which is pierced by diametrical hole 50 through which clip 24 may be passed. Rear section 48 has a diameter such as to fit in barrel 18.

To use the invention, the object causing deflation of the tire 52 is removed with pliers or otherwise. Next, a plug 42 partly is inserted in the barrel with clip 24 therethrough and forced into the hole 54. By pulling on trigger 37, adhesive in the chamber such as rubber cement or tire patch cement is forced out of the barrel saturating plug 42 with adhesive as it forces plug 42 out of the barrel. Using chain 26, plug 42 is pulled outwardly until seat or flange 46 hits the inside surface of the tire. At that point, the clip 24 is removed and tubular portion 48 is severed even with the tire treads.

As shown in FIG. 4, barrel 18 is detachably threaded to the wall of tubular passage 28 so that various size barrels may be substituted.

The assembly of the invention is particularly useful in emergencies, especially when some air still remains in the tire as it allows for continuing on at least to the next gas station where the tire can be inflated.

The operation and use of the invention hereinabove described will be evident to those skilled in the art to which it relates from a consideration of the foregoing.

It will thus be seen that there is provided a device in which the several objects of this invention are achieved, and which is well adapted to meet the conditions of practical use.

It is thought that persons skilled in the art to which this invention relates will be able to obtain a clear understanding of the invention after considering the foregoing description in connection with the accompanying drawing. Therefore, a more lengthy description is deemed unnecessary.

It is to be understood that various changes in shape, size and arrangement of the elements of this invention as claimed may be resorted to in actual practice, if desired.

Having thus described the invention, what is claimed as new and to be secured by Letters Patent is:

1. Tire patching apparatus comprising a gun-shaped adhesive injector incuding a hollow handle communicating with a tubular barrel; an adhesive chamber defined by walls of said handle and by a lever pivoted to the inner end of said barrel; a trigger operatively coupled to said lever for forcing adhesive out of said barrel; a resilient patch adapted to enter into a hole in a tire; said patch including a tubular rear portion fitting in said barrel for injection into said hole by pressure of adhesive being squeezed out of said barrel and a flanged front end; and means on said injector for retaining said patch while said patch enters said hole.

2. The invention as recited in claim 1, wherein said means on said injector consists of a chain secured thereto at one end thereof and a clip secured to the other end, said patch having a diametrical opening in said tubular portion thereof receiving said clip therein.

3. The invention as recited in claim 1, wherein said patch has a conical head for facilitating entry into a hole.

* * * * *